United States Patent
Lindemann et al.

(10) Patent No.: US 9,297,429 B2
(45) Date of Patent: Mar. 29, 2016

(54) BEARING-LESS TORQUE CONVERTER

(71) Applicant: Schaeffler Technologies GmbH & Co. KG, Herzogenaurach (DE)

(72) Inventors: Patrick M. Lindemann, Wooster, OH (US); Markus Steinberger, Macedonia, OH (US); John Carrier, Westfield, OH (US)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 0 days.

(21) Appl. No.: 14/479,873

(22) Filed: Sep. 8, 2014

(65) Prior Publication Data

US 2015/0068857 A1    Mar. 12, 2015

Related U.S. Application Data

(60) Provisional application No. 61/876,325, filed on Sep. 11, 2013.

(51) Int. Cl.
*F16D 33/18*    (2006.01)
*F16H 45/02*    (2006.01)

(52) U.S. Cl.
CPC ............... *F16D 33/18* (2013.01); *F16H 45/02* (2013.01); *F16H 2045/0231* (2013.01); *F16H 2045/0289* (2013.01)

(58) Field of Classification Search
CPC ......... F16D 33/02; F16D 33/18; F16H 41/00; F16H 41/04; F16H 41/24; F16H 41/30; F16H 45/02; F16H 2045/0205; F16H 2045/0231; F16H 2045/0252; F16H 2045/0278; F16H 2045/0289
See application file for complete search history.

(56) References Cited

U.S. PATENT DOCUMENTS

| | | | | |
|---|---|---|---|---|
| 2013/0230385 | A1* | 9/2013 | Lindemann | F16D 33/18 415/122.1 |
| 2014/0097055 | A1* | 4/2014 | Lindemann | F16H 41/24 192/3.21 |
| 2015/0021135 | A1* | 1/2015 | Jameson | F16D 33/18 192/3.28 |
| 2015/0027110 | A1* | 1/2015 | Lindemann | F16H 41/24 60/338 |
| 2015/0027111 | A1* | 1/2015 | Steinberger | F16D 33/18 60/338 |

* cited by examiner

*Primary Examiner* — Jacob S Scott
(74) *Attorney, Agent, or Firm* — Simpson & Simpson, PLLC

(57) ABSTRACT

A torque converter, including: a cover; an impeller shell; a turbine shell; a turbine clutch formed by the turbine and impeller shells; and a stator formed of a single piece of material and including a protrusion extending in an axial direction and having a radial surface. In a drive mode: the cover transmits torque to the impeller shell; the turbine clutch is open; the radial surface forms an entirety of a portion of the stator closest, in the axial direction from the stator toward the turbine shell, to the turbine shell; and the radial surface is free of contact with the turbine shell. In a coast mode for the torque converter, at least a portion of the radial surface is in contact with the turbine shell or is separated from the turbine shell by a layer of fluid in contact with the radial surface and the turbine shell.

20 Claims, 8 Drawing Sheets

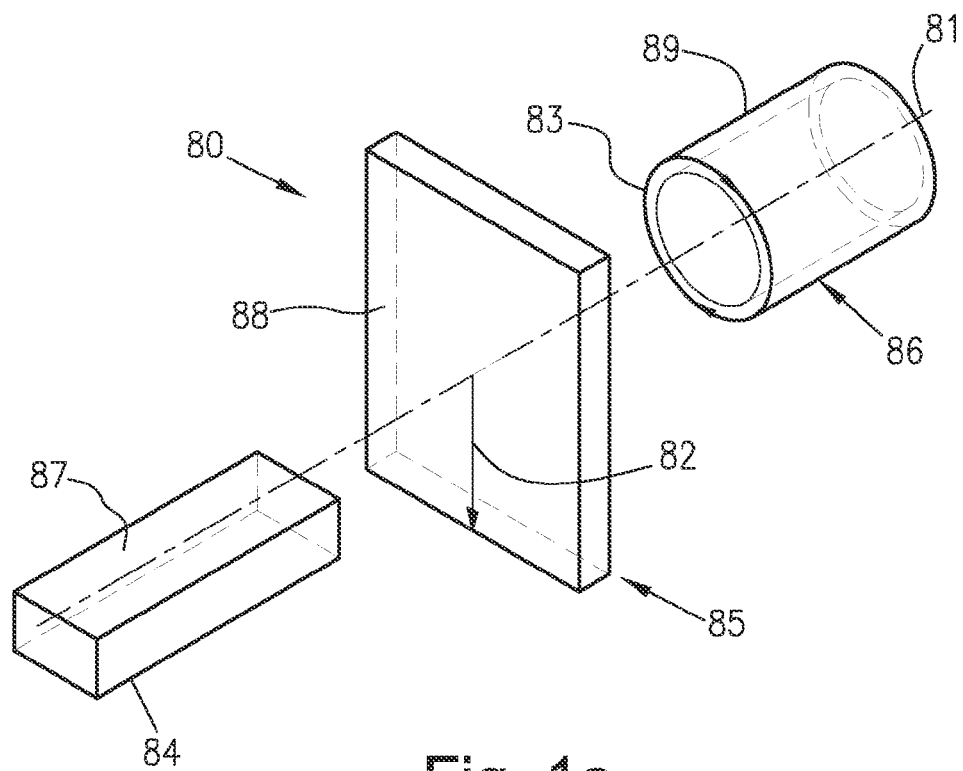
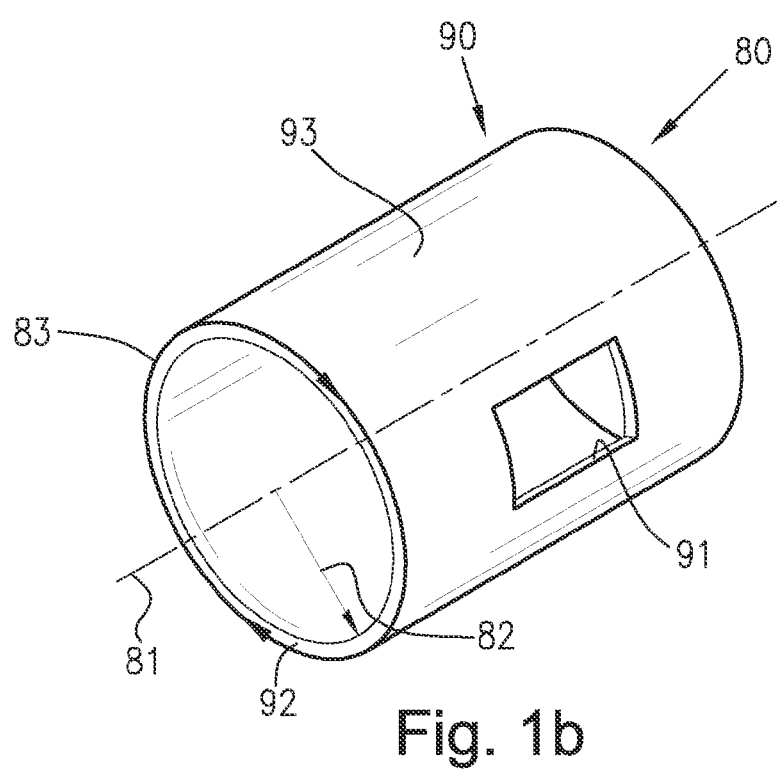

BEARING-LESS TORQUE CONVERTER

CROSS-REFERENCE TO RELATED APPLICATIONS

This application claims the benefit under 35 U.S.C. §119 (e) of U.S. Provisional Patent Application No. 61/876,325, filed Sep. 11, 2013, which application is incorporated herein by reference in its entirety.

TECHNICAL FIELD

The present disclosure relates to a bearing-less torque converter, in particular, a torque converter free of respective bearings between the stator and the impeller and turbine shells. The bearing-less torque converter uses grooved surfaces on the stator to engage the impeller and turbine shells and to create respective layers of fluid to reduce friction between the stator and the impeller and turbine shells. The bearing-less torque converter also includes a configuration of a turbine clutch and a gap between the stator and the turbine shell to minimize thrust forces on the stator.

BACKGROUND

It is known to use a phenolic stator body in a torque converter and to contact the stator body directly with turbine and/or impeller shells. However, phenolic is extremely brittle, the phenolic material suffers degradation in the high speed, high pressure, and high temperature environment inside a torque converter, and phenolic stator subsequently suffer from undesirably high fail rates. It is known to replace a bearing, between a stator in a torque converter and the impeller shell or the turbine shell, with a bushing or friction material. It is known to include grooves in a metallic stator body for a torque converter. In general, roller bearings are engaged with the grooved surfaces. Known grooves are aligned orthogonally to an axis of rotation for the torque converter, or form a straight diagonal line with respect to a radius of the axis of rotation.

SUMMARY

According to aspects illustrated herein, there is provided a torque converter, including: an axis of rotation; a cover arranged to receive torque from an engine; an impeller with at least one first blade and an impeller shell non-rotatably connected to the cover and including a first portion radially outward from the at least one first blade; a turbine with at least one second blade and a turbine shell including a second portion radially outward from the at least one second blade; a turbine clutch including the first and second portions; and an metallic stator formed of only a single piece of material and including at least one third blade and a body portion. The body portion includes: a radially outermost end to which the at least one third blade is non-rotatably connected; a radially innermost end; and a first protrusion extending from the body portion in a first axial direction toward the impeller shell and including a first radially extending surface; a first radially outer circumference and a first radially inner circumference bounding the first radially extending surface; a first groove in the first radially extending surface including a first end open to the outer circumference and extending radially inward and in a circumferential direction; and a second groove in the first radially extending surface including a second end open to the inner circumference and extending radially inward and in a circumferential direction. In a drive mode for the torque converter: the first portion is rotatable with respect to the second portion; the cover is arranged to transmit torque to the impeller shell; the first radially extending surface forms a segment of the body portion closest, in the first axial direction, to the impeller shell; and the torque converter is free of a first component axially disposed between the stator and the impeller shell, radially disposed between the radially innermost and outermost ends of the body and in contact with the stator and the impeller shell.

According to aspects illustrated herein, there is provided a torque converter, including: an axis of rotation; a cover arranged to receive torque from an engine; an impeller with at least one first blade and an impeller shell non-rotatably connected to the cover and including a first portion radially outward from the at least one first blade; an impeller hub non-rotatably connected to a radially inner portion of the impeller shell; a turbine with at least one second blade and a turbine shell including a second portion radially outward from the at least one second blade; a turbine clutch including the first and second portions; and a stator formed of only a single piece of material and including at least one third blade and a protrusion extending in a first axial direction and including an annular radially disposed surface. In a drive mode for the torque converter: the cover is arranged to transmit torque to the impeller shell; the first portion and second portions are rotatable with respect to each other; the annular radially disposed surface forms an entirety of a portion of the stator closest, in a first axial direction from the stator toward the turbine shell, to the turbine shell; and the annular radially disposed surface is free of contact with the turbine shell. In a coast mode for the torque converter: the impeller hub is arranged to transmit torque to the impeller shell; the first portion and second portions are rotatable with respect to each other; and at least a portion of the annular radially disposed surface is in contact with the turbine shell or is separated from the turbine shell by a layer of fluid in contact with the annular radially disposed surface and the turbine shell.

According to aspects illustrated herein, there is provided a torque converter, including: an axis of rotation; a cover arranged to receive torque from an engine; an impeller with at least one first blade and an impeller shell non-rotatably connected to the cover and including a first portion radially outward from the at least one first blade; a turbine with at least one second blade and a turbine shell including a second portion radially outward from the at least one second blade; a torque converter clutch including the first and second portions; and an metallic stator formed of only a single piece of material. The stator includes: a body portion including a radially outermost end to which the at least one third blade is non-rotatably connected; a radially innermost end; and a first protrusion extending from the body portion in a first axial direction toward the impeller shell and including a first radially extending surface; a first radially outer circumference and a first radially inner circumference bounding the first radially extending surface; a first groove in the first radially extending surface including a first end open to the outer circumference and extending radially inward and in a circumferential direction; a second groove in the first radially extending surface including a second end open to the inner circumference and extending radially inward and in a circumferential direction. In a drive mode for the torque converter: the cover is arranged to transmit torque to the impeller shell; the first portion is rotatable with respect to the second portion; and at least a portion of the first radially extending surface is in contact with the impeller shell or separated from the impeller shell by a layer of a fluid in contact with the first radially disposed surface and the impeller shell.

BRIEF DESCRIPTION OF THE DRAWINGS

Various embodiments are disclosed, by way of example only, with reference to the accompanying schematic drawings in which corresponding reference symbols indicate corresponding parts, in which:

FIG. 1A is a perspective view of a cylindrical coordinate system demonstrating spatial terminology used in the present application;

FIG. 1B is a perspective view of an object in the cylindrical coordinate system of FIG. 1A demonstrating spatial terminology used in the present application;

DETAILED DESCRIPTION

Figure 2:
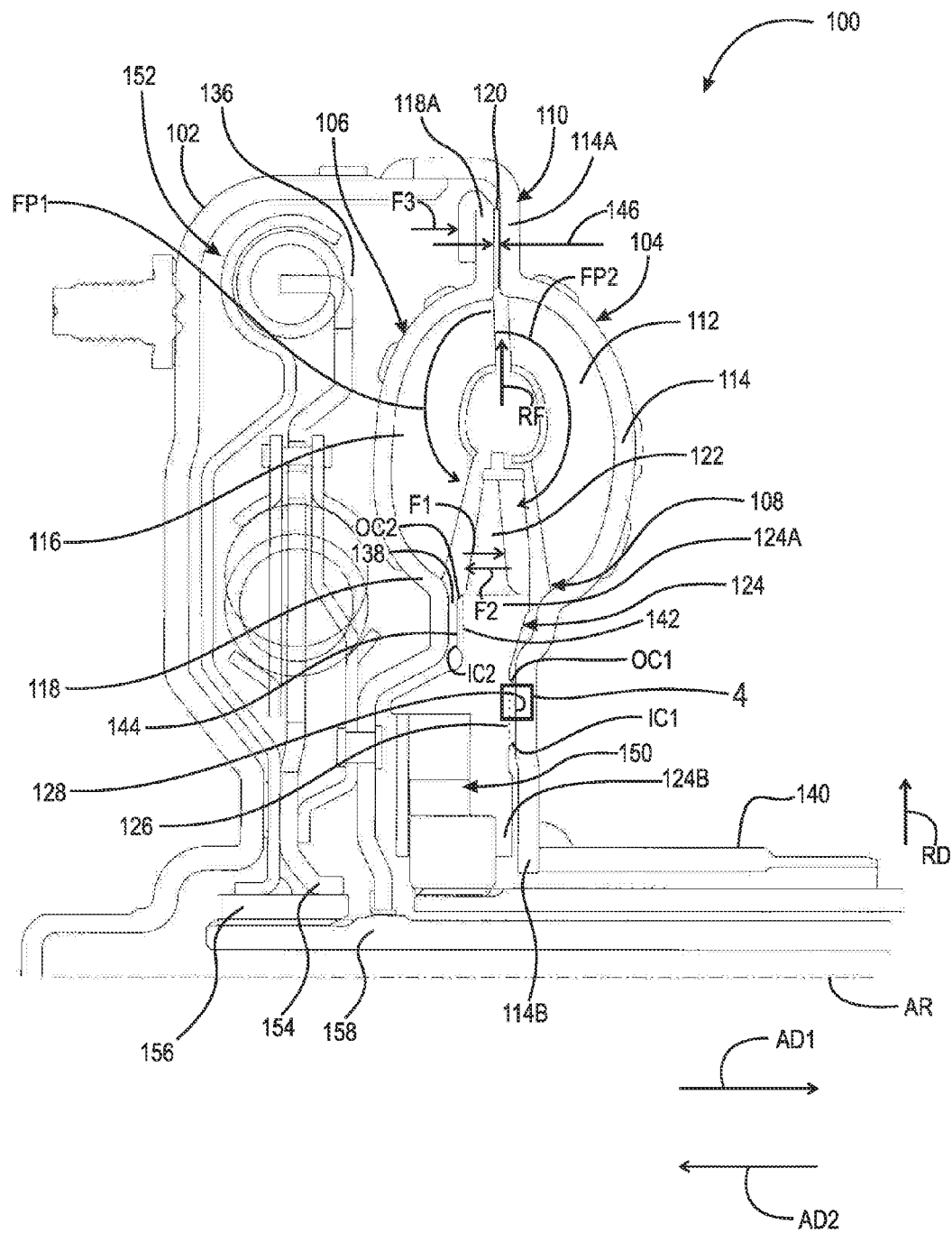
FIG. 2 is a partial cross-sectional view of a bearing-less torque converter, with a series vibration damper, in a lock-up mode.

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

FIG. 1A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

FIG. 1B is a perspective view of object 90 in cylindrical coordinate system 80 of FIG. 1A demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93. Surface 91 is part of an axial plane, surface 92 is part of a radial plane, and surface 93 is a circumferential surface.

FIG. 2 is a partial cross-sectional view of bearing-less torque converter 100, with a series vibration damper, in a lock-up mode. Torque converter 100 includes: axis of rotation AR; cover 102 arranged to receive torque from an engine (not shown); impeller 104; turbine 106; stator 108, and turbine, or torque converter, clutch 110. Impeller 104 includes at least one blade 112 and impeller shell 114 non-rotatably connected to the cover and including portion 114A radially outward from blade 112. Turbine 106 includes at least one blade 116 and turbine shell 118 including portion 118A radially outward from blade 116. The turbine clutch includes portions 114A and 118A of shells 114 and 118, respectively. In an example embodiment, clutch 110 includes friction material 120 axially disposed between portions 114A and 118A.

FIGS. 3A through 3G are details of grooves in the stator shown in FIG. 2. The following should be viewed in light of FIGS. 2 through 3G. Stator 108 is formed from a single piece of metallic material and includes at least one blade 122 and body portion 124. Body portion 124 includes: radially outermost end 124A to which blade 122 is non-rotatably connected; radially innermost end 124B; and protrusion 126 extending from the body portion in axial direction AD1 toward the impeller shell. Protrusion 126 includes: radially extending surface 128 (substantially orthogonal to axis AR); radially outer circumference OC1 and radially inner circumference IC1 bounding surface 128, for example, in radial direction RD; at least one groove 130 in surface 128; and at least one groove 132 in surface 128. Each groove 130 includes end 130A open to outer circumference OC1 and extending radially inward (toward axis AR) and in circumferential direction CD. Each groove 132 includes end 132A open to inner circumference IC1 and extending radially outward (away from axis AR) and in circumferential direction CD.

Figure 3A:
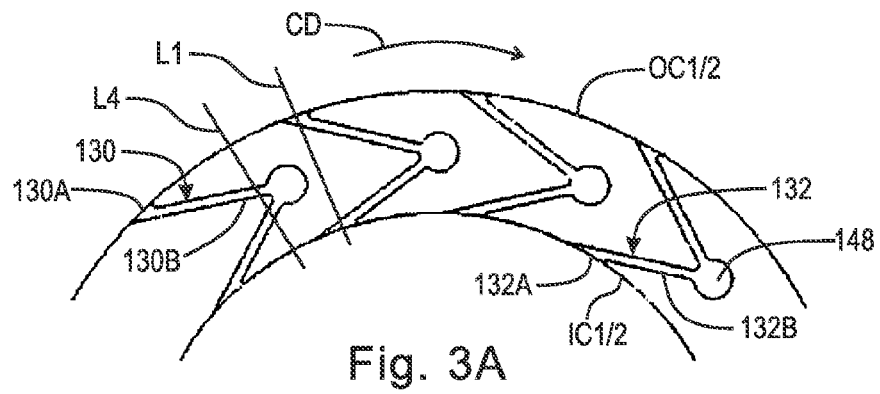
FIGS. 3A through 3G are details of grooves in the stator shown in FIG. 2.
Figure 3B:
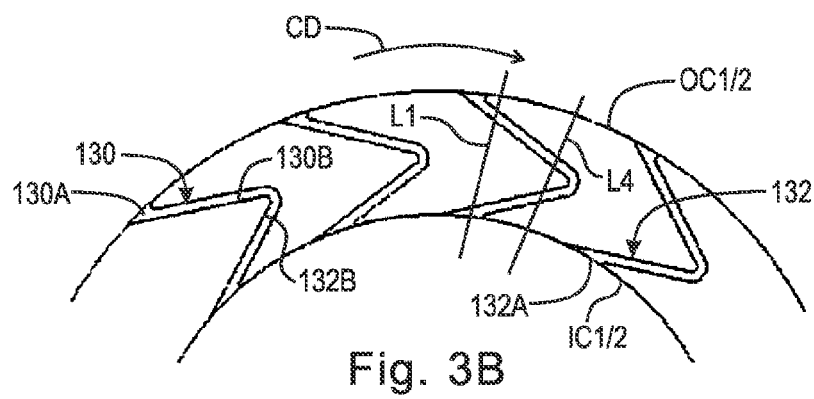
Figure 3C:
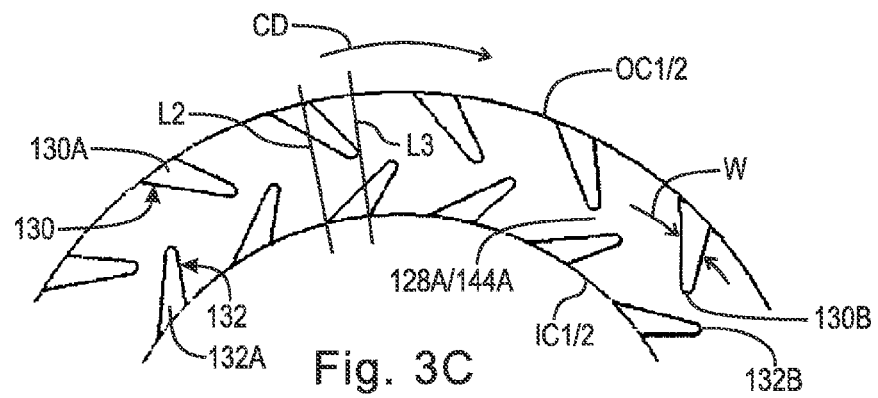
Figure 3D:
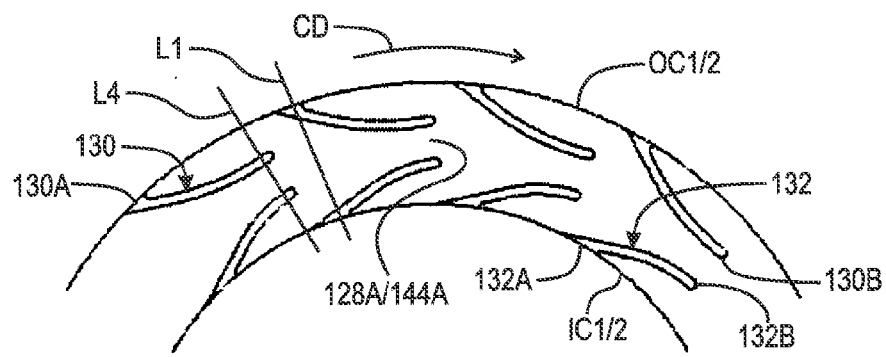
Figure 3E:
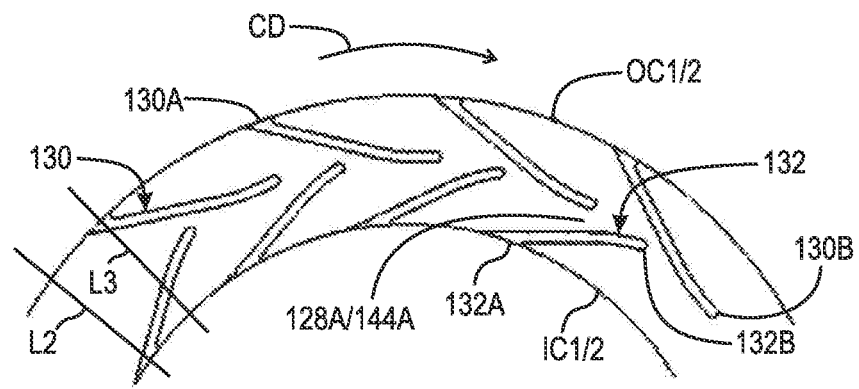
Figure 3F:
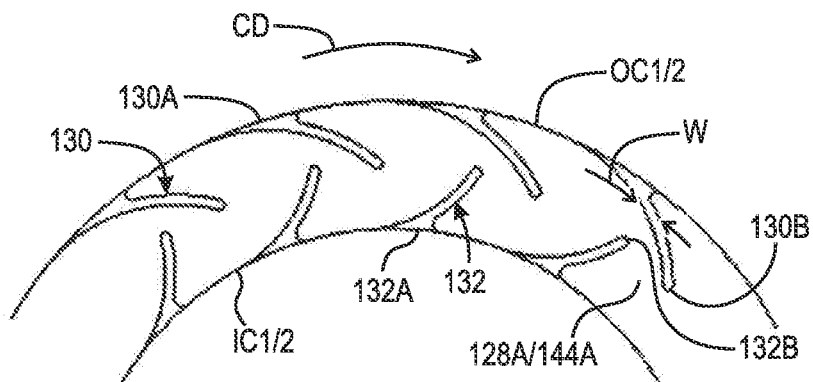
Figure 3G:
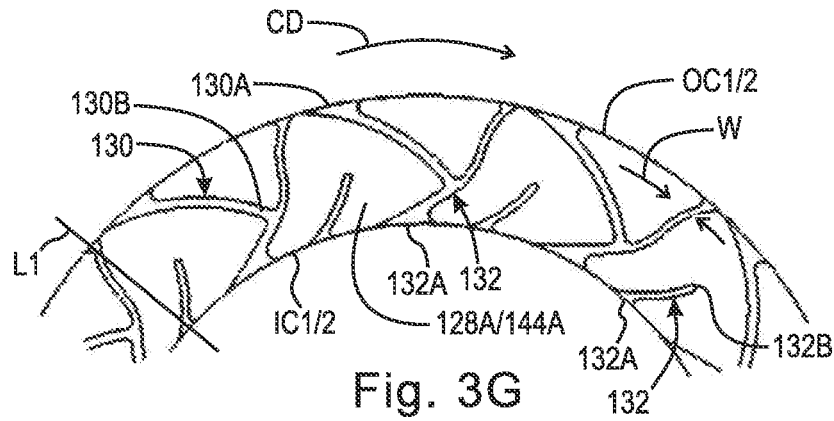
Figure 4:
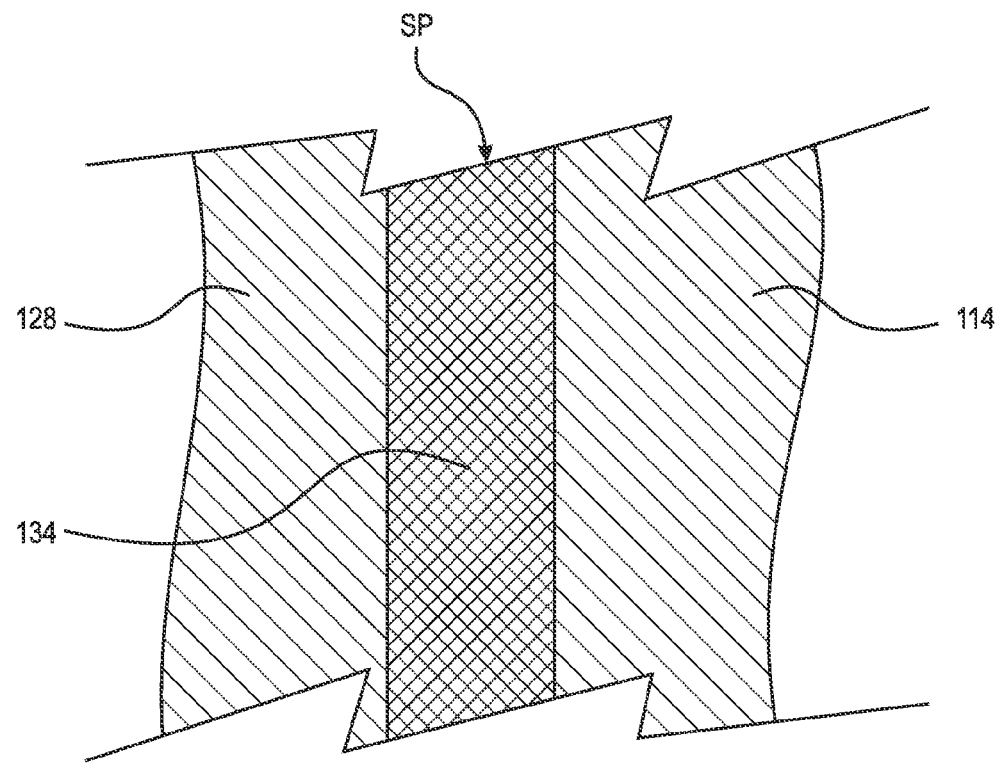
FIG. 4 is a detail of area 4 in FIG. 2 showing a film of fluid.

FIG. 4 is a detail of area 4 in FIG. 2 showing a film of fluid. The following should be viewed in light of FIGS. 2 through 4. In the drive mode of FIG. 2, cover 102 transmit torque to impeller shell 114 and clutch 110 is open, that is, portion 114A is rotatable with respect to portion 118A. As a result of the torque transmission and rotation of the impeller and the turbine, the stator is displaced in direction AD1 with force F1 by fluid circulating between the turbine and the impeller in flow path FP1 and surface 128 forms the segment of body portion 124 closest, in direction AD1, to the impeller shell. For example, as further described below, surface 128 is in contact with impeller shell 114, or is separated from the impeller shell only by film, or layer, 134 of the fluid in the torque converter. Film 134 is in contact with surface 128 and the impeller shell. During initial rotation, there may be contact between surface 128 and the impeller shell while the film is being formed. Also, it is possible that variations in the surface of the impeller shell or surface 128 can cause localized areas of contact.

Thus, torque converter 100 does not include any component, such as a bearing, made of a solid material, axially disposed between the stator and the impeller shell; radially disposed between ends 124A and 124B of the body, and in contact with the stator and the impeller shell. The reference to "made of a solid material" is to address the interpretation of the fluid being considered a component of the torque converter.

In the drive mode, space SP is formed between surface 128 and the impeller shell by the interaction of the fluid with grooves 130 and 132. For example, grooves 130 and 132 are arranged to be filled with the fluid, and at least a portion of the space is arranged to be filled with film 134. Thus, the film acts as a cushion to reduce friction between the stator and the impeller shell, for example, performing the function of a bearing. In drive mode, the impeller shell is arranged to rotate in circumferential direction CD to flow the fluid from end 130A through groove 130 and to flow the fluid from end 132A through groove 132A. The fluid then displaces, or flows out of, grooves 130 and 132 to form film 134.

In drive mode, force F1 is transmitted from surface 128 to the impeller shell through contact between surface 128 and the impeller shell and/or through film 134.

Figure 5:
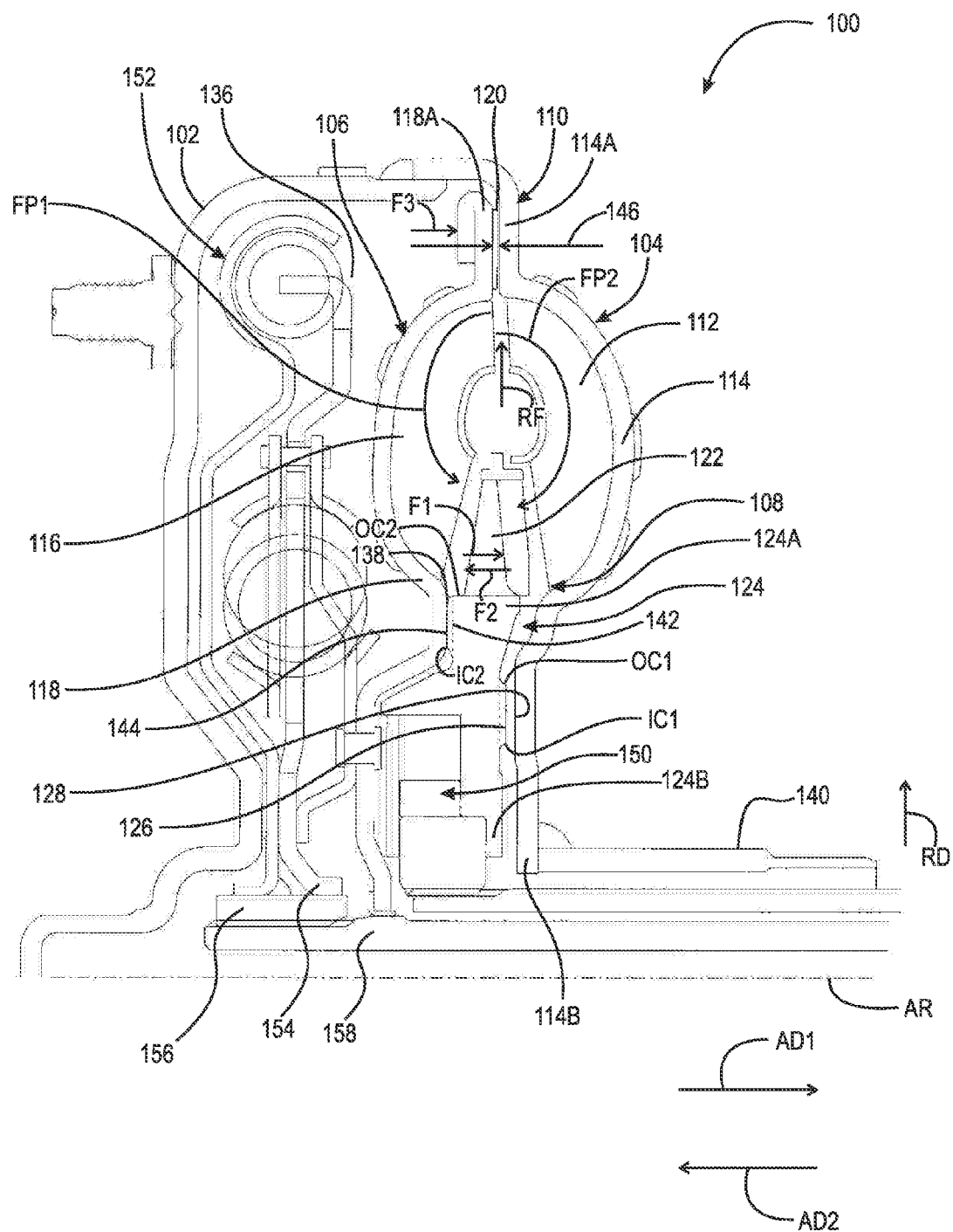
FIG. 5 is a partial cross-sectional view of the bearing-less torque converter of FIG. 2 in a coast mode.

FIG. 5 is a partial cross-sectional view of torque converter 100 in coast mode. FIGS. 3A through 3G are applicable to the discussion that follows. Torque converter 100 includes impeller hub 140 non-rotatably connected to radially inner portion 114B of the impeller shell. In coast mode, hub 140 transmits torque to shell 114 and portion 114A is rotatable with respect to portion 118A, that is, clutch 110 is open. Stator 108 includes protrusion 142 extending from the body portion in axial direction AD2, opposite direction AD1, toward the turbine shell. Protrusion 142 includes: radially extending surface 144 (substantially orthogonal to axis AR); radially outer circumference OC2 and radially inner circumference IC2 bounding surface 144, for example, in radial direction RD; at least one groove 130 in surface 144; and at least one groove 132 in surface 144. Each groove 130 includes end 130A open to outer circumference OC2 and extending radially inward (toward axis AR) and in circumferential direction CD. Each groove 132 includes end 132A open to inner circumference IC2 and extending radially outward (away from axis AR) and in circumferential direction CD.

The description of the interface of shell 114, surface 128, and film 134 is applicable to shell 118 surface 144. In coast mode for the torque converter, the impeller hub is arranged to transmit torque to the impeller shell. As a result of the torque transmission and rotation of the impeller and the turbine, the stator is displaced in direction AD2 with force F2 by fluid circulating between the turbine and the impeller in flow path FP2, and surface 144 forms the segment of body portion 124 closest, in direction AD2, to the turbine shell. For example, as further described below, surface 144 is in contact with turbine shell 118, or is separated from the turbine shell only by film 134 of the fluid in the torque converter. Film 134 is in contact with surface 144 and the turbine shell. During initial rotation, there may be contact between surface 144 and the turbine shell while the film is being formed. Also, it is possible that variations in the surface of the turbine shell or surface 144 can cause localized areas of contact. The discussion of FIG. 4 is applicable to surface 144, shell 118, and film 134.

Thus, torque converter 100 does not include any component, such as a bearing, made of a solid material, axially disposed between the stator and the turbine shell; radially disposed between ends 124A and 124B of the body, and in contact with the stator and the turbine shell.

In the coast mode, space SP is formed between surface 144 and the turbine shell by the interaction of the fluid with grooves 130 and 132. For example, grooves 130 and 132 are arranged to be filled with the fluid, and at least a portion of the space is arranged to be filled with film 134. Thus, the film acts as a cushion to reduce friction between the stator and the turbine shell, for example, performing the function of a bearing. In the coast mode, the impeller shell is arranged to rotate in circumferential direction CD to flow the fluid from end 130A through groove 130 and to flow the fluid from end 132A through groove 132A. The fluid then displaces, or flows out of, grooves 130 and 132 to form film 134. In coast mode, force F2 is transmitted from surface 144 to the turbine shell through contact between surface 144 and the turbine shell and/or through film 134.

Torque converter 100 also minimizes the thrust forces upon surface 144 and the impeller shell through the configuration of gap 138 and gap 146 formed when clutch 110 is open, for example, between a combination of portions 114A and 118A and material 120. The width of gap 146 has been exaggerated for presentation purposes. To close clutch 110 for a lock-up mode, pressure in chamber 136 is increased to displace turbine 106 in direction AD1 with force F3. As portions 114A and 118A are brought into substantially non-rotatable connection, force F3 is transmitted from portion 118A to portion 114A. Gap 138 is sized so that when gap 146 is closed to engage clutch 110, contact is prevented between surface 144 and the turbine hub, accounting for axial distortion of the turbine shell due to force F3. Thus, the stator is isolated from force F3 in lock-up mode and the only force experienced by surface 144 is force F2 in coast mode.

Returning to FIGS. 3A through 3G, the following provides further detail regarding grooves 130 and 132. In an example embodiment as shown in FIGS. 3A, 3B, and 3G, groove 130 includes end 130B opposite end 130A and groove 132 includes end 132B, opposite end 132A and connected to end 130A. When fluid flows through grooves 130 and 132 in direction CD and in the respective radial directions, the respective fluid streams meet at the juncture of ends 130B and 132B. Since further flow is blocked at this point, the fluid is forced axially outward onto surface 128 or 144 to create film 134. The hydrostatic pressure of the fluid in the grooves and resulting from the film creates space SP and separates surfaces 128 or 144 from the impeller or turbine shells, respectively. In an example embodiment as shown in FIG. 3A, chamber 148 is formed at the juncture of ends 130B and 132B. Chamber 148 increases the volume of fluid flowing out of grooves 130 and 132 to form film 134.

In an example embodiment as shown in FIGS. 3A, 3B, 3D, and 3G, line L1 orthogonal to axis of rotation AR passes through ends 130A and 132A. In an example embodiment as shown in FIGS. 3C, 3E, and 3F, no line orthogonal to axis of rotation AR passes through ends 130A and 132A. For example, lines L2 and L3, orthogonal to axis AR do not overlap at ends 130A and 132A. In an example embodiment as shown in FIGS. 3C through 3G, groove 130 includes end 130B opposite end 130A and groove 132 includes end 132B, opposite end 132A. Ends 130B and 132B terminate between OC1/2 and IC1/2 and are isolated by portion 128A or portion 144A of radially disposed surfaces 128 or 144, respectively. When fluid flows through grooves 130 and 132 in direction CD and the respective radial directions, the respective fluid streams meet ends 130B and 132B. Since further flow is blocked at this point, the fluid is forced axially outward onto surface 128 or 144 to create film 134. The hydrostatic pressure of the fluid in the grooves and resulting from the film separates surfaces 128 or 144 from the impeller or turbine shells, respectively.

In an example embodiment as shown in FIGS. 3C, 3E, 3F, and 3G, groove 130 includes end 130B opposite end 130A and groove 132 includes end 132B, opposite end 132A. Ends 130B and 132B terminate between OC1/2 and IC1/2 and are isolated by portion 128A or portion 144A of radially disposed surfaces 128 or 144, respectively. Using end 130B as the starting point, end 132B is further in direction CD. It should be understood that the preceding order/sequence can be reversed. By circumferentially staggering ends 130B and 132B, the points at which fluid spills out onto surfaces 128 and 144 can be staggered, providing a more even and homogenous creation of film 134.

In an example embodiment as shown in FIGS. 3A, 3B, and 3D, groove 130 includes end 130B opposite end 130A and groove 132 includes end 132B, opposite end 132A. Ends 130B and 132B terminate between OC1/2 and IC1/2. Line L4, orthogonal to axis AR, passes through ends 130B and 132B.

In an example embodiment as shown in FIGS. 3C and 3F, width W of openings 130A and 132A increase with respect to circumferential direction CD as grooves 130 and 132 extend in circumferential direction CD. The large value of width W at the circumferences enhances fluid flow into grooves 130 and 132.

Grooves 130 and 132 can be used on cast aluminum, forged steel, or coined steel. The grooves reduce friction by building fluid film 134 on surfaces 128 and 144. The fluid film is stabilized through the grooves' pumping effect. A surface rotating in direction CD and sliding on top of the grooves causes shear forces in the fluid that drag the fluid into the grooves. At ends 130B and 132B, the respective flows through grooves 130 and 132 terminate or meet, causing the fluid to spill over surfaces 128 and 144. The design of grooves 130 and 132 stabilizes film 134 at high temperatures and high relative speeds between surfaces 128 and 144 and impeller shell 114 and turbine shell 118, respectively.

In an example embodiment, at least respective portions of protrusion 126 and surface 128 are radially outward of one-way clutch 150 for the stator. In an example embodiment, at least respective portions of protrusion 142 and surface 144 are radially outward of one-way clutch 150 for the stator. In an example embodiment, all of protrusion 142 and surface 144 is radially outward of one-way clutch 150 for the stator.

In an example embodiment, torque converter 100 includes series damper 152 with output flange 154 non-rotatably connected to output hub 156. Hub 156 is arranged to non-rotatably connect to transmission input hub 158.

Figure 6:
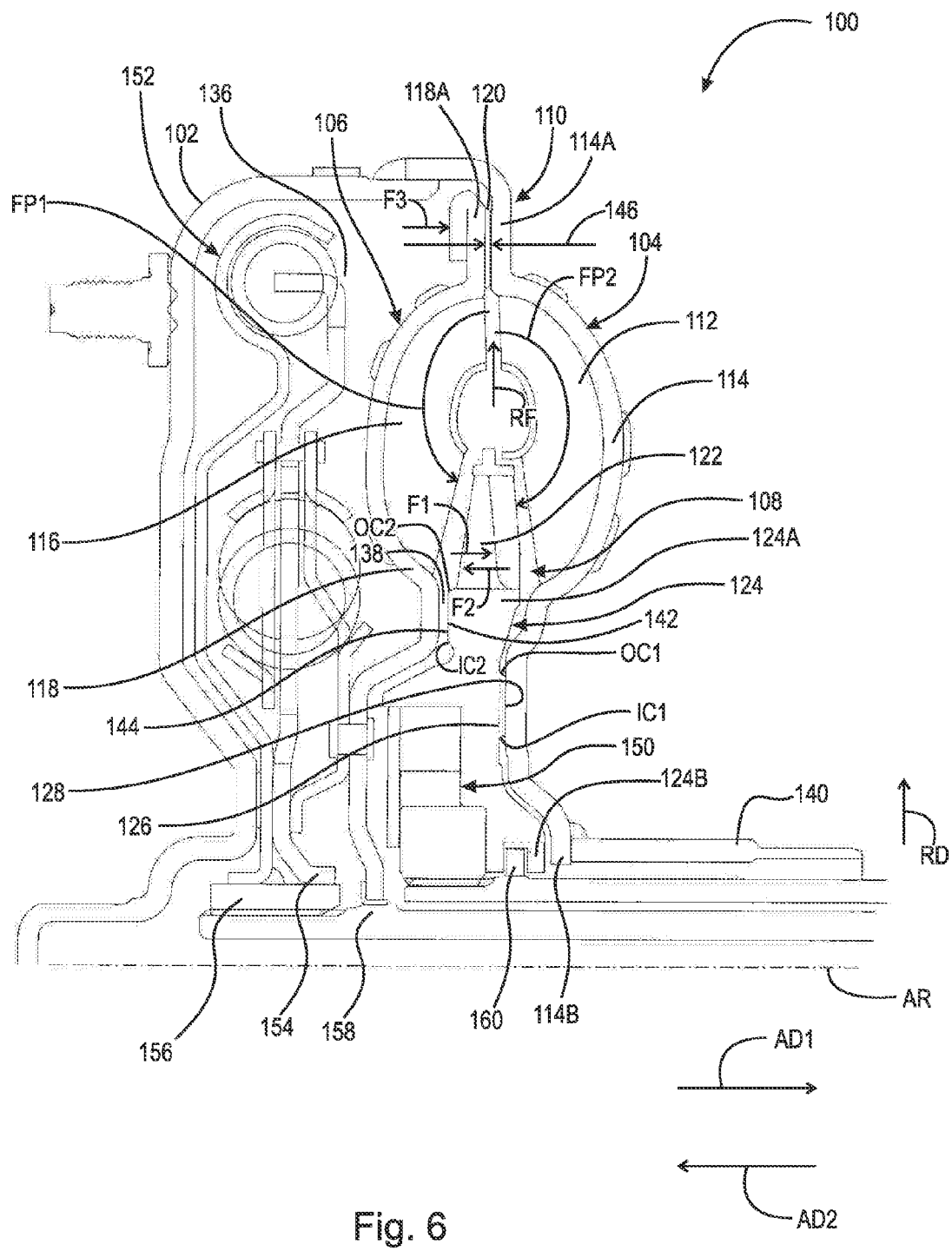
FIG. 6 is a partial cross-sectional view of the bearing-less torque converter of FIG. 2 with a seal at the stator; and, FIG. 7 is a partial cross-sectional view of bearing-less torque converter of FIG. 2 with a single stage damper.

FIG. 6 is a partial cross-sectional view of bearing-less torque converter 100 with seal 160 at the stator. The discussion for FIG. 2 is applicable to FIG. 6 except as follows. In an example embodiment, torque converter 100 includes seal 160, sealing body 124 against shaft 158 to reduce force F3 on portion 114A during drive mode by forcing release flow RF through gap 146. Release flow RF causes the stator to lift off the impeller and create a fluid film on potion 114A. To avoid creating a flow restriction when clutch 110 is closed, seal 160 includes channels (not shown) to enable flow through the seal.

Figure 7:
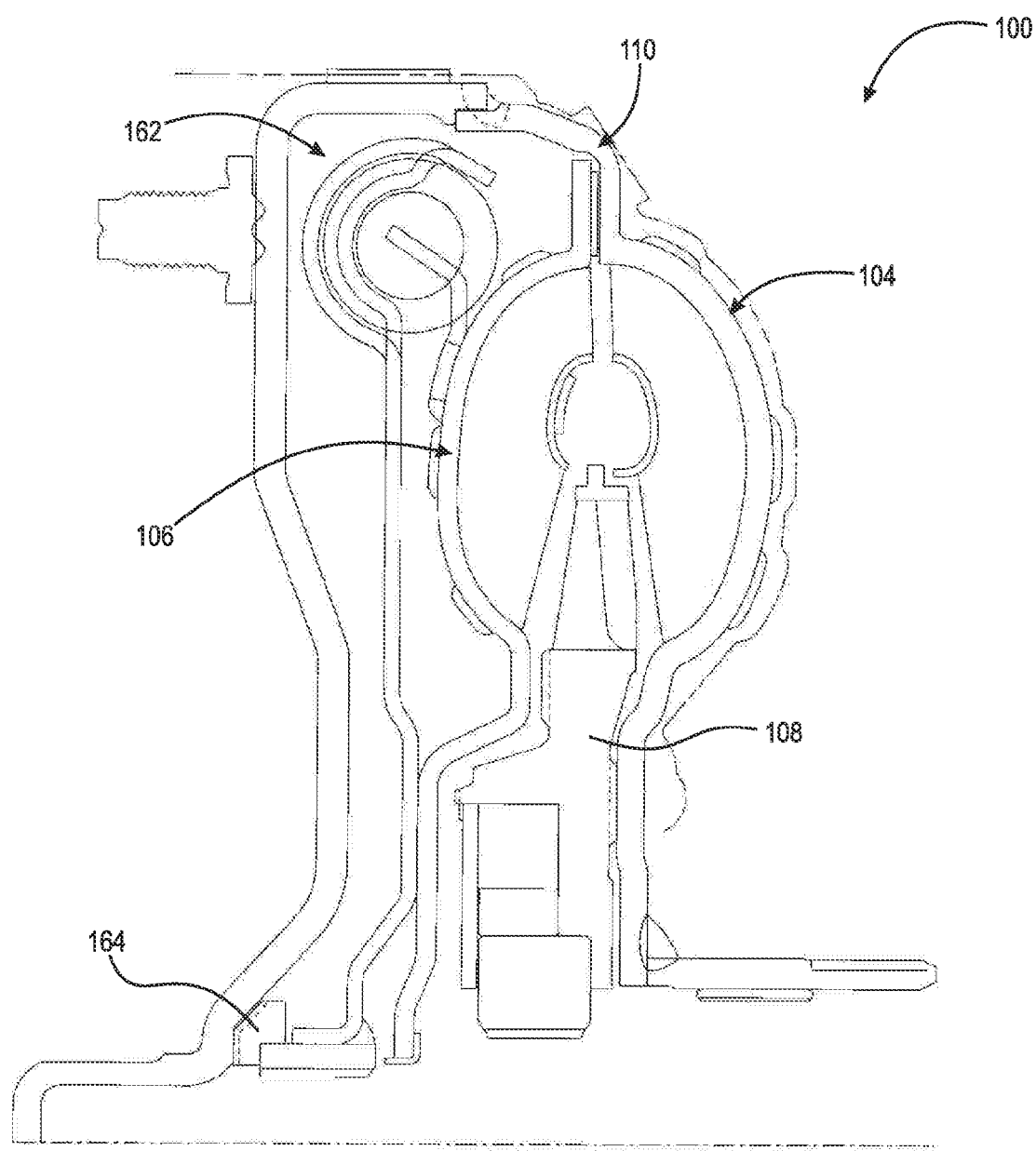

FIG. 7 is a partial cross-sectional view of bearing-less torque converter 100 with a single stage damper. The discussion for FIG. 2 is applicable to FIG. 7 except as follows. In an example embodiment, torque converter 100 includes single stage vibration damper 162. In an example embodiment, torque converter 100 includes plastic thrust washer 164.

The following provides further detail regarding torque converter 100. As shown in FIG. 2, in drive mode, turbine 106 is pushed in direction AD1. Advantageously, force F3 is transmitted to impeller 104 through portions 118A and 114A, instead of to stator 108. When clutch 110 is disengaged, or open, for example in drive mode, flow between portions 118A and 114A provides a fluid film between portions 118A and 114A, reducing friction and. Force F1 on the impeller shell via surface 128 is advantageously lower than in a typical torque converter because F1 consists only of stator thrust, for example, fluid force on blades 122, enabling replacement of a roller bearing with surface 128 having grooves 130 and 132. That is, surface 128, grooves 130 and 132 and film 134 are sufficient to prevent wear.

When clutch 110 is engaged, or closed, the turbine and impeller have the same speed and portion 118A does not experience an axial load. The stator also spins with the turbine and impeller and does not experience a thrust force.

Under coast, the turbine is pushed is direction AD2 and the associated thrust load is transmitted to cover 102, for example, by damper 152 or damper 162 and thrust washer 164. In coast mode, the stator experiences force F2 in direction AD2 towards the turbine shell, causing surface 144 to contact the turbine shell. Force F2 is low enough that surface 144, grooves 130 and 132 and film 134 are sufficient to prevent wear on surface 144 and the turbine shell. Gap 138 is designed to prevent contact between the turbine shell and surface 144 during drive and lock-up modes.

Typical torque converter stacks lead through the stator assembly. The configuration of torque converter 100 stacks directly from the turbine to the impeller, which makes possible control of gap 146 to a tighter tolerance, which increases efficiency. In addition, forces F1 and F2 on the stator are lower.

To improve coast engagement quality, portion 118A can be preloaded by damper 152 or 162. The preloading removes end play and results in a smoother engagement.

As noted above, phenolic stators in direct contact with turbine and/or impeller shells for a torque converter suffer from unacceptably high failure rates. Known metallic stator bodies would suffer unacceptably high friction and wear as well as reduced efficiency if engaged directly with impeller or turbine shells. Advantageously, due to grooves 130 and 132 in surface 128 and/or surface 144, metallic stator 108 functions without roller bearings, bushings, or ancillary components between the stator and shells 114 and/or 118. The elimination of bearings in torque converter 100 advantageously reduces cost, complexity, parts count, and axial dimension.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

We claim:

1. A torque converter, comprising:
an axis of rotation;
a cover arranged to receive torque from an engine;
an impeller with at least one first blade and an impeller shell non-rotatably connected to the cover and including a first portion radially outward from the at least one first blade;
a turbine with at least one second blade and a turbine shell including a second portion radially outward from the at least one second blade;

a turbine clutch including the first and second portions; and, a metallic stator formed of only a single piece of material and including:
  at least one third blade; and,
  a body portion including:
    a radially outermost end to which the at least one third blade is non-rotatably connected;
    a radially innermost end; and,
    a first protrusion extending from the body portion in a first axial direction toward the impeller shell and including:
      a first radially extending surface;
      a first radially outer circumference and a first radially inner circumference bounding the first radially extending surface;
      a first groove in the first radially extending surface:
        including a first end open to the outer circumference; and,
        extending radially inward and in a circumferential direction;
      a second groove in the first radially extending surface:
        including a second end open to the inner circumference; and,
        extending radially inward and in a circumferential direction,
  wherein:
    in a drive mode for the torque converter:
      the first portion is rotatable with respect to the second portion;
      the cover is arranged to transmit torque to the impeller shell;
      the first radially extending surface forms a segment of the body portion closest, in the first axial direction, to the impeller shell; and,
      the torque converter is free of a first component:
        axially disposed between the stator and the impeller shell;
        radially disposed between the radially innermost and outermost ends of the body; and,
        in contact with the stator and the impeller shell.

2. The torque converter of claim 1, wherein in the drive mode for the torque converter, at least a portion of the first radially disposed surface:
  is in contact with the impeller shell; or,
  is separated from the impeller shell by a layer of a fluid in contact with the first radially disposed surface and the impeller shell.

3. The torque converter of claim 1, wherein in the drive mode for the torque converter:
  a space is formed between the first radially disposed surface and the impeller shell;
  the first and second grooves are arranged to be filled with a fluid; and,
  at least a portion of the space is arranged to be filled with a film of the fluid.

4. The torque converter of claim 3, wherein in the drive mode:
  the impeller shell is arranged to rotate in the circumferential direction to flow the fluid:
    from the first end through the first groove; and,
    from the second end through the second groove; and,
  the fluid is arranged to displace from first and second grooves onto the first radially disposed surface to form the film.

5. The torque converter of claim 3, wherein in the drive mode for the torque converter, the first force is transmitted from the first radially disposed surface to the impeller shell through the film of fluid.

6. The torque converter of claim 1, wherein in the drive mode for the torque converter a second force is transmitted from the second portion to the first portion in the first axial direction.

7. The torque converter of claim 1, further comprising:
  an impeller hub non-rotatably connected to a radially inner portion of the impeller shell, wherein:
  the body of the stator includes a second protrusion extending from the body in a second axial direction, opposite the first axial direction, toward the turbine shell and including:
    a second radially extending surface;
    a second radially outer circumference and a second radially inner circumference bounding the second radially extending surface;
    a third groove in the second radially extending surface:
      including a third end open to the second outer circumference; and,
      extending radially inward and in the circumferential direction;
    a fourth groove in the second radially extending surface:
      including a fourth end open to the second inner circumference; and,
      extending radially inward and in the circumferential direction;
  in a coast mode for the torque converter:
    the impeller hub is arranged to transmit torque to the impeller shell;
    the first portion is rotatable with respect to the second portion;
    the second radially extending surface forms an entirety of a second portion of the body closest, in the second axial direction, to the turbine shell; and,
    the torque converter is free of a second component:
      axially disposed between the stator and the turbine shell;
      radially disposed between the radially innermost and outermost ends of the body; and,
      in contact with the stator and the turbine shell.

8. The torque converter of claim 7, wherein in the coast mode for the torque converter:
  a space is formed between the second radially disposed surface and the turbine shell;
  the third and fourth grooves are arranged to be filled with a fluid; and,
  at least a portion of the space is arranged to be filled with a film of the fluid.

9. The torque converter of claim 1, wherein:
  the first groove includes a third end opposite the first end;
  the second groove includes a fourth end, opposite the second end and connected to the third end.

10. The torque converter of claim 1, wherein a line orthogonal to the axis of rotation passes through the first and second ends.

11. The torque converter of claim 1, wherein no line orthogonal to the axis of rotation passes through both the first end and the second end.

12. The torque converter of claim 1, wherein:
  the first groove includes a third end opposite the first end and terminating between the radially inner and outer circumferences;

the second groove includes a fourth end opposite the second end and terminating between the radially inner and outer circumferences; and, the third end is isolated from the fourth end by a portion of the radially disposed surface.

13. The torque converter of claim 1, wherein:

the first groove includes a third end opposite the first end and terminating between the radially inner and outer circumferences;

the second groove includes a fourth end opposite the second end and terminating between the radially inner and outer circumferences; and, the third end is located further in the circumferential direction than the fourth end; or, the fourth end is located further in the circumferential direction than the third end.

14. The torque converter of claim 1, wherein:

the first groove includes a third end opposite the first end and terminating between the radially inner and outer circumferences;

the second groove includes a fourth end opposite the second end and terminating between the radially inner and outer circumferences; and, a line orthogonal to the axis of rotation passes through the third and fourth ends.

15. The torque converter of claim 1, wherein:

a width of the first groove, with respect to the circumferential direction, increases as the first groove extends in the circumferential direction;

a width of the second groove, with respect to the circumferential direction, increases as the second groove extends in the circumferential direction.

16. The torque converter of claim 1, wherein:

the stator includes a one-way clutch located radially between the plurality of blades and the axis of rotation; and, at least a portion of the annular protrusion is radially outward of the one-way clutch.

17. A torque converter, comprising:

an axis of rotation;

a cover arranged to receive torque from an engine;

an impeller with at least one first blade and an impeller shell non-rotatably connected to the cover and including a first portion radially outward from the at least one first blade;

a turbine with at least one second blade and a turbine shell including a second portion radially outward from the at least one second blade;

an impeller hub non-rotatably connected to a radially inner portion of the impeller shell;

a turbine clutch including the first and second portions; and, a stator formed of only a single piece of material and including:
  at least one third blade; and,
  a protrusion extending in a first axial direction and including an annular radially disposed surface and at least one groove in the annular radially disposed surface; wherein:

in a drive mode for the torque converter:
  the cover is arranged to transmit torque to the impeller shell;
  the first portion and second portions are rotatable with respect to each other;

the annular radially disposed surface forms an entirety of a portion of the stator closest, in a first axial direction from the stator toward the turbine shell, to the turbine shell; and, the annular radially disposed surface is free of contact with the turbine shell; and, in a coast mode for the torque converter:
  the impeller hub is arranged to transmit torque to the impeller shell;
  the first portion and second portions are rotatable with respect to each other; and,
  at least a portion of the annular radially disposed surface:
    is in contact with the turbine shell; or,
    is separated from the turbine shell by a layer of fluid in contact with the annular radially disposed surface and the turbine shell.

18. The torque converter of claim 17, wherein:

the stator includes:
  a radially outermost end to which the at least one third blade is non-rotatably connected;
  a radially innermost end;
  a radially outer circumference and a radially inner circumference bounding the annular radially disposed surface;
  a first groove in the annular radially disposed surface:
    including a first end open to the outer circumference; and,
    extending radially inward and in a circumferential direction;
  a second groove in the first radially extending surface:
    including a second end open to the inner circumference; and,
    extending radially inward and in a circumferential direction; and, in the coast mode for the torque converter:
  the torque converter is free of a component:
    axially disposed between the stator and the turbine shell;
    radially disposed between the radially innermost and outermost ends of the stator; and,
    in contact with the stator and the turbine shell.

19. The torque converter of claim 18, wherein in the coast mode:

the impeller shell is arranged to rotate in the circumferential direction to flow the fluid from the first end to the second end and from the third end to the fourth end; and, the fluid is arranged to displace from the third and fourth ends onto the first radially disposed surface to form the film.

20. A torque converter, comprising:

an axis of rotation;

a cover arranged to receive torque from an engine;

an impeller with at least one first blade and an impeller shell non-rotatably connected to the cover and including a first portion radially outward from the at least one first blade;

a turbine with at least one second blade and a turbine shell including a second portion radially outward from the at least one second blade;

a torque converter clutch including the first and second portions; and, an metallic stator formed of only a single piece of material and including:
  a body portion including:
    a radially outermost end to which the at least one third blade is non-rotatably connected;
    a radially innermost end; and, a first protrusion extending from the body portion in a first axial direction toward the impeller shell and including:
a first radially extending surface;
a first radially outer circumference and a first radially inner circumference bounding the first radially extending surface;
a first groove in the first radially extending surface:
including a first end open to the outer circumference; and,
extending radially inward and in a circumferential direction;
a second groove in the first radially extending surface:
including a second end open to the inner circumference; and,
extending radially inward and in a circumferential direction, wherein in a drive mode for the torque converter:
the cover is arranged to transmit torque to the impeller shell;
the first portion is rotatable with respect to the second portion; and,
at least a portion of the first radially extending surface is:
in contact with the impeller shell; or,
separated from the impeller shell by a layer of a fluid in contact with the first radially disposed surface and the impeller shell.

* * * * *